Oct. 1, 1946.   H. W. BOWKER   2,408,602
DOUGH DIVIDING MACHINE
Filed June 27, 1944   2 Sheets-Sheet 1

Inventor
H. W. Bowker

Oct. 1, 1946.   H. W. BOWKER   2,408,602
DOUGH DIVIDING MACHINE
Filed June 27, 1944   2 Sheets-Sheet 2

Inventor
H. W. Bowker

Patented Oct. 1, 1946

2,408,602

UNITED STATES PATENT OFFICE 2,408,602

DOUGH DIVIDING MACHINE

Harry Whalley Bowker, Peterborough, England, assignor to Baker Perkins Limited, Peterborough, England Application June 27, 1944, Serial No. 542,339
In Great Britain December 10, 1943

4 Claims. (Cl. 107—15)

This invention relates to dough dividing machines of the single or multi-pocket type wherein the ram means is reciprocated by cam or like action through lever means or other operative connections. In such machines when adapted for dividing one or other of two weights of dough pieces, the ram means makes the same length of stroke when delivering the dough for filling the pockets for one weight as for the other. For example, in a divider adapted to divide pieces of dough using either pockets for making dough pieces for a 2-lb. loaf or for a 1-lb. loaf, the dividing reciprocating stroke of the ram is the same in both cases.

An aim of the invention is to provide improvements calculated to reduce wear and strain on the mechanical parts of the machine and to reduce the pressure or felling action caused by the pocket filling stroke of the ram means to a minimum with a view to effecting a consequent improvement in the quality of the divided dough.

The invention consists in a lost motion device and resilient or buffer means incorporated in the operative connection between the coupling rod and the actuating cam or like power means and capable of being brought into operation when it is intended to divide dough pieces according to the lesser weights of dough for which the machine is designed, to impart a shorter cushioned dividing stroke to the ram than when the machine is set for dividing the weights of dough for the larger loaves.

According to the preferred arrangement the sliding collar to which the cam operated bell crank lever is connected may be formed in two parts between which a buffer spring is arranged, means being provided for holding the parts solid in this extended relation or allowing collapsing movement against the action of the buffer spring.

Figure 1:
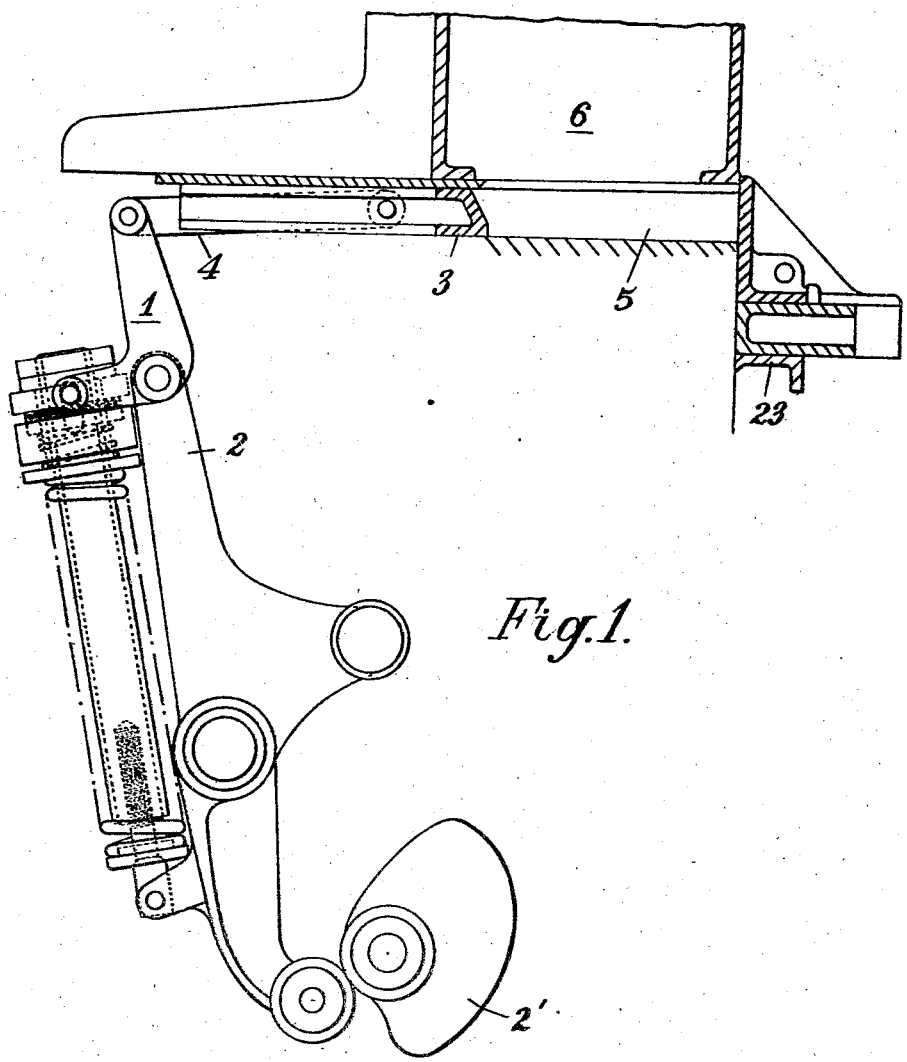
Figure 2:
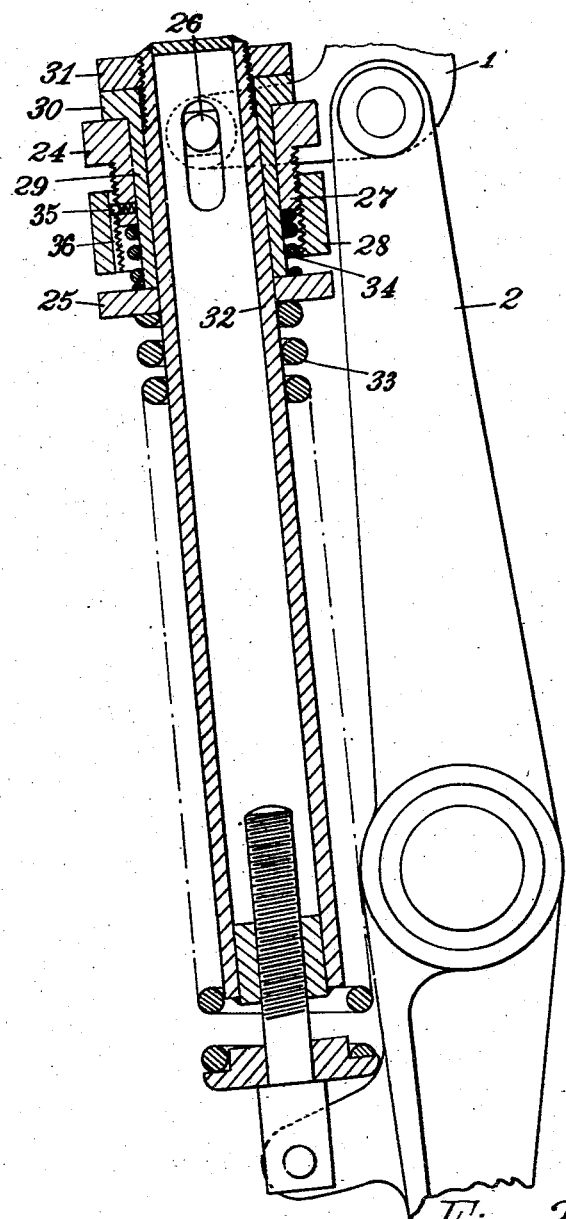

In the accompanying drawings:

Figure 1 is an elevation, partly in section, showing the main parts of a divider, with the improved lost motion and buffer means, and Figure 2 is a sectional elevation of the lost motion means applied to the ram actuating lever means.

In carrying the invention into effect as described by way of example as applied to a dough dividing machine of the character described in British Patent No. 435,166 of which Messrs. Baker Perkins Limited are the registered proprietors the connecting rod 4 unites the auxiliary or bell-crank lever 1 carried by the main lever 2 operated by a cam 2' and the ram 3 which reciprocate in the box 5 located below the supply hopper 6 the ram 3 forces dough into the measuring box 23 and displaces the plunger 22 therein according to the setting of the adjustable scaling stop (not shown).

The sliding collar to which one arm of the articulated bell-crank lever 1 is pivotally connected is formed transversely in two parts 24 and 25. The upper part 24 of the collar is provided with trunnions 26 by which it is connected to the bell-crank lever 1 and has a depending sleeve portion 27 which is exteriorly threaded to receive a knurled threaded sleeve 28. The upper part 24 is mounted to slide on an inner sleeve 29 which is provided at its upper end with a flange 30 abutting the lock nut 31 which is threaded on the upper end of the tubular rod 32. This inner sleeve 29 extends below the upper part 24 of the sliding collar.

The lower part 25 of the sliding collar has a sliding fit on the tubular rod 32 and seats against the lower end of the inner sleeve 29, being held thereagainst by the resilient spring means 33 which surrounds the tubular rod.

Between the upper and lower parts of the sliding collar a buffer spring 34 is located, such spring being of a relatively light nature as compared with the main spring 33.

The upper part 24 of the sliding collar normally abuts against the flange 30 on the inner sleeve member 29 and with the upper part 24 in such position the lower part 25 engaging the lower end of said sleeve 29, the parts may be held solid by screwing back the knurled threaded sleeve 28 until it engages the lower part 25. With the parts in such position the resilience of the buffer spring is neutralized.

By screwing the knurled sleeve 28 onto the upper part 24 of the sliding collar and away from the lower part 25 the buffer spring 34 will become operative until such time as it is compressed and the lower part 25 of the sliding collar comes into engagement with the knurled sleeve 28 which forms an abutment means.

The knurled sleeve 28 may be held in its adjusted position by any suitable means such as a spring pressed ball 35 carried by the upper part 24 engaging recesses or a groove 36 in the sleeve.

In setting the device for scaling 1-lb. loaves, the appropriate adjustment in the division box having been made, the knurled collar 28 is screwed onto the upper part 24 of the sliding collar to space it from the lower part 25 of said collar. With the parts in this position during the feeding stroke of the ram there will be a period of lost motion in which the lower part 25 of the collar will move toward the knurled collar or abutment 28 compressing the buffer spring 34. When contact with the abutment 28 is made, the two parts 24, 25 of the sliding collar move together to give the necessary pressure to fill the scaling chamber.

When the device is to be set for scaling 2-lb. loaves, the knurled sleeve 28 is screwed back into engagement with the lower part 25 of the sliding collar so that there is no lost motion, the collar parts 24, 25 moving together solid throughout the stroke.

While it is convenient for the knurled sleeve 28 to be screwed on the sliding collar part 24, such may simply be mounted to slide thereon, suitable means such as a pin or collar being provided to hold the parts in their adjusted positions.

I claim:

1. A dough dividing machine comprising a reciprocating ram, a cam-operated oscillating lever, a coupling rod between the lever and the ram, spring means between the lever and the coupling rod providing a yielding pressure of the ram on the dough and a lost-motion transmission incorporationg resilient buffer means located between said spring means and the coupling rod, to impart a shorter cushioned dividing stroke to the ram when dividing dough pieces of the lesser weight for which the machine is designed.

2. A dough dividing machine comprising a reciprocating ram, a cam actuated oscillating lever, a bell crank lever pivoted to said oscillating lever, spring means located on one arm of said bell crank to provide a yielding pressure of the ram on the dough, a coupling rod connecting the other arm of the bell crank with the ram, and a lost motion means located between the spring means and said bell crank and comprising a two part device incorporating buffer means capable of being alternatively set to operate as a solid device when dividing larger weights of dough, or separated to afford lost motion against the resilience of said buffer means for a portion of the dividing stroke, until towards the end of said stroke the parts of said device impart a solid thrust.

3. A dough dividing machine as claimed in claim 2, wherein said lost motion means comprises collar means through which the spring means acts on the bell crank lever, said collar means comprising two parts between which a buffer spring is mounted, an axially adjustable sleeve located on one of said parts and adapted to be moved to a position for holding said parts solid or to a position permitting a lost motion period against the action of the buffer spring followed by a solid thrust.

4. A dough dividing machine as claimed in claim 2, wherein said lost motion means comprises collar means through which the spring means act on the bell crank lever, said collar means comprising two parts between which a buffer spring is mounted, an axially adjustable sleeve threaded on one part and movable to a position in which the parts are solid or to a position permitting lost motion against the buffer spring followed by a solid thrust.

HARRY WHALLEY BOWKER.